(12) United States Patent
Nishimura et al.

(10) Patent No.: US 6,436,490 B1
(45) Date of Patent: Aug. 20, 2002

(54) MONOSTABLE FERROELECTRIC LIQUID CRYSTAL DISPLAY APPARATUS

(75) Inventors: Teiichiro Nishimura, Kanagawa; Keiichi Nito, Tokyo; Tadaaki Isozaki, Kanagawa; Eiji Okabe, Chiba; Ryushi Shundo, Chiba; Hideo Saito, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/559,460

(22) Filed: Apr. 28, 2000

(30) Foreign Application Priority Data

Apr. 30, 1999  (JP) ............................................. 11-125182

(51) Int. Cl.[7] ........................ C09K 19/34; G02F 1/1333; G02F 1/137
(52) U.S. Cl. ................... 428/1.1; 252/299.61; 349/133; 349/184
(58) Field of Search ..................... 428/1.1; 252/299.61; 349/133, 184, 173

(56) References Cited

U.S. PATENT DOCUMENTS 5,214,523 A  *  5/1993  Nito et al. .................. 349/173
5,323,172 A  *  6/1994  Koden ......................... 345/97
5,347,381 A  *  9/1994  Shinomiya et al. ........... 359/78
5,363,225 A  * 11/1994  Minamihara et al. ......... 359/56
5,573,703 A  * 11/1996  Terada et al. ........... 252/299.01

* cited by examiner

Primary Examiner—Shean C. Wu
(74) Attorney, Agent, or Firm—Sonnenschein, Nath & Rosenthal (57) ABSTRACT

A monostable ferroelectric liquid crystal display in which a stable monostable mode is realized to achieve sufficient analog gradation and contrast. A pair of substrates, processed with uniaxial orientation, are placed so that the directions of orientation processing will be substantially parallel to each other. Into the gap between the two substrates is charged a ferroelectric liquid crystal material. The component of projection on the substrates of the axial direction of a cone drawn by the liquid crystal molecules of the ferroelectric liquid crystal material and that of the axial direction of the liquid crystal molecules themselves are substantially coincident with the direction of the processing for orientation of the substrates. Monostability is achieved with this state as an initial state. The ferroelectric liquid crystal material is a liquid crystal composition including a compound comprised of a phenyl pyrimidine skeleton to each terminal end of which is linked an alkyl chain, with the sum of carbon atoms of the alkyl chains being equal to 17.

3 Claims, 4 Drawing Sheets

MONOSTABLE FERROELECTRIC LIQUID CRYSTAL DISPLAY APPARATUS

BACKGROUND OF THE INVENTION

1. Field of the Invention

This invention relates to a novel monostable ferroelectric liquid crystal display apparatus employing a liquid crystal material having a chyral smectic C-phase.

2. Description of the Related Art

Up to now, a liquid crystal display device is extensively used as a lightweight thin display device. In particular, a TFT driven twisted nematic (TN) display device is preferentially used for this purpose.

However, the above display device suffers the problem of gradation reversing behavior in the half tone, a narrow angle of field and slow response time amounting to tens of milliseconds (msec). In particular, the response time between the half tones exceeds 100 msec, such that there is observed the phenomenon of bleeding due to delayed picture display.

Under this situation, a ferroelectric liquid crystal is stirring up notice as a liquid crystal material which not only improves the angle of field of view and simultaneously shortens the response time, and the possibility of application thereof to display is now under investigation.

It has been proposed by Clark et al in Appl. Phys. Lett. 36,899 (1980), U.S. Pat. No. 4,367,924 and Japanese Patent Publication S-60-22287 a passive matrix driven type surface-stabilized ferroelectric liquid crystal display SSFLCD exploiting the bistability having two memory states obtained on unravelling the pitch of the helix of the ferroelectric liquid crystal in a narrow gap cell.

This SSFLCD has an advantage that it can realize a monochromatic display device of a wide angle of field However, although this SSFLCD has a response time per pixel as short as tens of microseconds ($\mu$sec), imposed by the passive matrix driving method, a high speed is not necessarily realized in a display having a large number of pixels. In particular, the SSFLCD is not applicable to moving picture display suited to the demand of the multi-media era.

Moreover, the number of pixels is also gradually increasing from so-called VGA through SVGA, XGA, SXGA and UXGA, in this sequence, such that display of a large capacity may now be realized. Thus, the principle of high speed display in the true sense of the term has been a desideratum.

For realizing this high speed response and wide field of angle display, the present Assignee has proposed a monostable FLC mode in Japanese Laying-Open Patent H-4-212126 or in U.S. Pat. No. 5214523.

This mode uses a liquid crystal device comprised of a pair of substrates processed with uniaxial orientation. These substrates are arranged facing each other with the respective directions of orientation processing parallel to each other, and a liquid crystal material having a chiral smectic C phase charged between the two substrates. The component of projection to the substrate of an axial direction of a cone delineated by the liquid crystal molecules of the liquid crystal material having this chiral smectic C phase and the component of projection to the substrate of the direction of the molecular axis of the liquid crystal molecule itself are set so as to be coincident with the direction of the orientation processing of the substrate. The mode has the monostable structure with the aforementioned state as an initial state. A switching element is provided for each pixel as the smallest unit in order to realize the active matrix driving. The director of the liquid crystal (tilt of the molecular axis) is changed continuously by application of an electrical voltage and the intensity of the transmitted light is modified in an analogous fashion to realize analog gradation representation with a wide angle of field and full color representation.

Specifically, the transparent electrode side of a glass plate having a transparent electrode (ITO) is processed with a silane coupling and coated with a film of a polyamide acid by a spin coating method. This film is imidized on baking to form a polyimide film. This polyimide film is processed with rubbing in one direction with a velvet cloth to provide an oriented film. The oriented film has a thickness of approximately 20Å and exhibits asymmetry with respect to the rubbing direction which produces the effect of the liquid crystal orientation. The glass plate, on which the oriented film has been produced as explained above, is arranged facing a transparent electrode so that the rubbing direction will be antiparallel to each other. Then, a cell with a gap of 2 $\mu$m is assembled using a UV cured adhesive comprised of micro-pearls 2 $\mu$m in diameter. The monostable FLC mode is realized using the following compound (a):

compound (a)

as a chiral component, and also using a tricyclic difluorine based compound (b), a phenyl pyrimidine based compound (c) and a phenyl benzoate based compound (d), as non-chiral components:

compound (b)

compound (c)

compound (d)

However, with the above liquid crystal compound, sufficient contrast has not been achieved due to the insufficient black level.

On the other hand, alkyl chains coupled to each other through an ether linkage or the alkyl chain directly coupled to a phenyl pyrimidine skeleton is used as a structure for each terminal of phenyl pyrimidine contained in the conventional liquid crystal composition.

However, if simply a dicyclic or tricyclic phenyl pyrimidine is used as a base liquid crystal as described in e.g., Japanese Laying-Open Patent H-9-165578, a bistable structure results, such that the monostable mode cannot be realized.

There are a variety of alkyl chains of the phenyl pyrimidine based liquid crystal of the phenyl pyrimidine based crystal, such that, if a liquid crystal composition is constituted without limiting the sorts of the alkyl chains, and this liquid crystal composition is injected into a liquid cell, the black level is not improved even on demonstrating the monostable mode. The major portion of the liquid cell is in the bistable state such that stable monostable mode cannot be realized.

The result is that the analog gradation by the active matrix driving proper to the nonostble FLC mode is not sufficiently obtained. On the other hand, the black level sinking is not sufficient and hence the contrast which satisfies the high quality display device is not obtained.

SUMMARY OF THE INVENTION

It is therefore an object of the present invention to provide a monostable ferroelectric liquid crystal display apparatus in which it is posible to realize stable monostable mode to achieve sufficient analog gradation and contrast.

The present invention provides a monostable ferroelectric liquid crystal display device made up of a pair of substrates, which have been subjected to uniaxial orientation processing, and which are arranged facing each other so that the respective directions of the orientation processing will be subsequently parallel to each other, and a ferroelectric liquid crystal material which has a chiral smectic C phase, and which is charged between these substrates, with a projection component on the substrates of an axial direction of a cone drawn by a liquid crystal molecule of said ferroelectric liquid crystal and with a projection component on the substrates of an axial direction of the liquid crystal molecule itself being subsequently equal to the direction of the orientation processing of the substrates, with the liquid crystal device being mono-stabilized with this state as an initial state, wherein the ferroelectric liquid crystal material is a liquid crystal composition containing a compound comprised of a phenyl pyrimidine skeleton on both terminals of which are linked alkyl chains the sum total of carbon atoms of which is equal to 17.

By the addition of dicyclic phenyl pyrimidine, comprised of a phenyl pyrimidine skeleton, on both terminals of which are linked alkyl chains the sum total of carbon atoms of which is equal to 17, a stable monostable ferroelectric liquid crystal display device mode is realized, although the precise mechanism is not known. Thus, the resulting liquid crystal device is improved in black level and in the contrast ratio.

Therefore, with the present invention, a monostable ferroelectric liquid crystal display device is achieved, in which a stabilized monostable mode is realized to achieve sufficient analog gradation and contrast.

DESCRIPTION OF THE PREFERRED EMBODIMENTS

Referring to the drawings, preferred embodiments of according to the present invention will be explained in detail.

Figure 1:
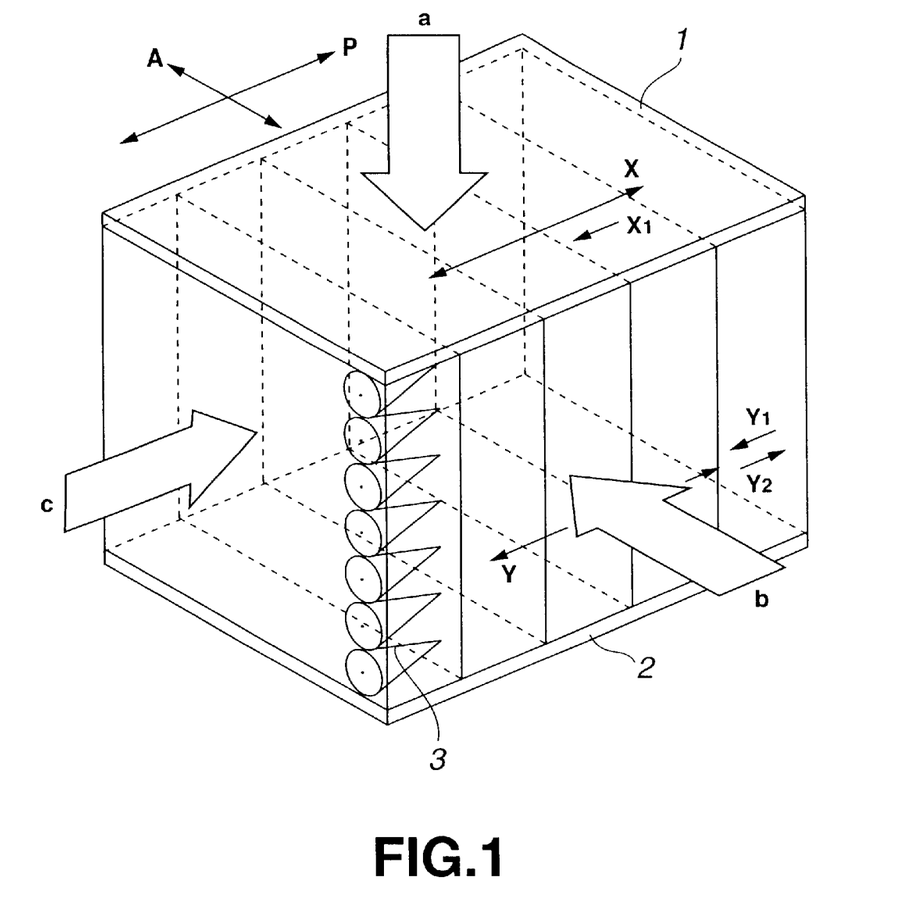
FIG. 1 is a perspective view schematically showing an illustrative structure of a liquid crystal cell in a monostable ferroelectric liquid crystal display device.

FIG. 1 shows the basic structure of a monostable ferroelectric liquid crystal display device embodying the present invention.

The basic structure of the monostable ferroelectric liquid crystal display device is shown in FIG. 1, in which a pair of substrates 1, 2 processed with uniaxial orientation processing such as rubbing or oblique vapor deposition are arranged facing each other, and in which a liquid crystal material having a SmC* phase is charged into a space between the substrates 1, 2.

The substrates 1, 2 are each formed by forming a transparent electrode on a transparent substrate, depositing a polyimide film thereon and by forming an oblique vapor deposited film thereon. The substrates 1, 2 are arranged so that respective directions of the uniaxial orientation processing, indicated by arrows X and Y in FIG. 1, will be substantially parallel to each other.

For rubbing the surfaces of polyimide films in one direction to form fine scratches on the surfaces for affording orientation, the films may be arranged so that the rubbing directions are the same, referred to below as parallel rubbing direction, or so that the rubbing directions are opposite to each other, referred to below as antiparallel rubbing direction. In the former case, the rubbing direction of the substrate 1 is X1 and that of the substrate 2 is Y1, whereas, in the latter case, the rubbing direction of the substrate 1 is X1 and that of the substrate 2 is Y1.

Figure 2:
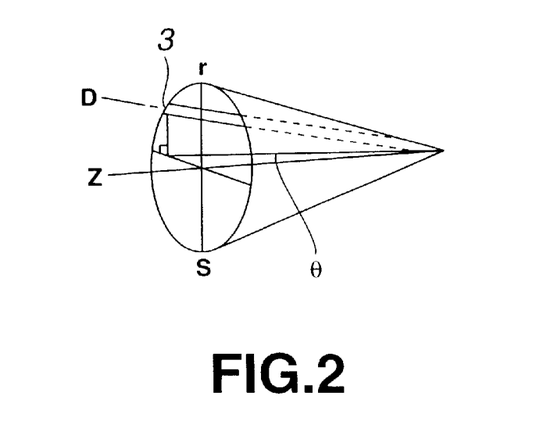
FIG. 2 is a schematic view illustrating a cone drawn by a liquid crystal molecule.

If the upper and lower substrates 1, 2 are processed with uniaxial orientation and arrayed so that the respective directions of orientation are substantially parallel to each other to form a liquid crystal cell, and a liquid crystal material having the SmC* phase is charged into the gap of the cell, the directions of the normal lines of the respective cells or the directions of the projected components to the substrate are coincident with the aforementioned direction of orientation. It is noted that liquid crystal molecules 3 of the respective layers are rotated along the outer peripherlal surface of the cone, as shown in FIG. 2. The axial direction Z or the direction of the projected component thereof on the substrate coincides with the aforementioned direction of the processing for orientation. Also, the direction D of the director (molecular axis) of the liquid crystal molecule 3 itself, or the direction of the projected component thereof on the substrate, also is coincident with the direction of the processing for orientation. That is, each liquid crystal molecule 3 is stabilized on a point r or s on the circumference of the cone.

Thus, the ferroelectric liquid crystal display device, embodying the present invention, exploiting the stabilization effect of the liquid crystal molecules on the substrate surface, does not exploit the bistability of the order of 30 to 45° of the memory cone, while it is not monostable but it is a mono-stabilized in an intermediate state, with the memory cone lower than 2°.

The ferroelectric liquid crystal display device is of such a structure in which, when seen from the normal line direction of the substrates 1 and 2, the uniaxial orientation processing directions X, Y of the substrates 1, 2, the axial direction Z of the cone drawn by the liquid crystal molecule 3 and the direction D of the director of the liquid crystal molecule 3 itself are coincident with one another, provided that no electrical field is applied.

It is noted that, if the directions of polarization of a pair of polarizers, that is an analyzer and a polarizer, having the directions of polarization A and P, respectively, remain perpendicular to each other, and one of the directions of polarization is brought into coincidence with the aforementioned direction of the processing for orientation, the light is not transmitted so that the black level is achieved.

If the electrical field is applied thereto, the director of the liquid crystal molecule 3 is rotated along the cone, such that the director is tilted continuously (in an analog fashion) towards right or left depending on the strength of the electrical field or the polarity and hence the continuous gradation (analog gradation) is achieved.

Although the driving voltage waveform of the electrical field applied is optional, an amplitude modulation type which is alternate application of (+) and (−) and which subsequently satisfies the electrical neutral conditions is desirable.

Figure 3:
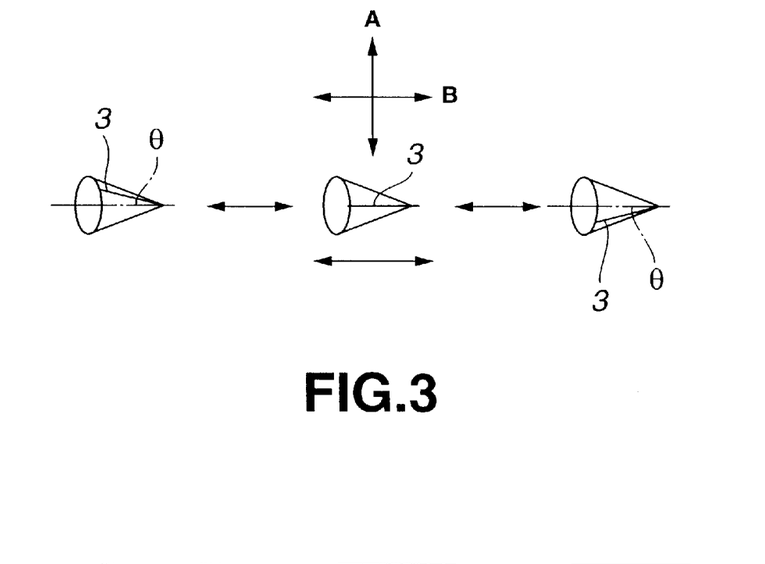
FIG. 3 is a schematic view showing the behavior if a liquid crystal molecule looking from the direction a of FIG. 1.
Figure 4:
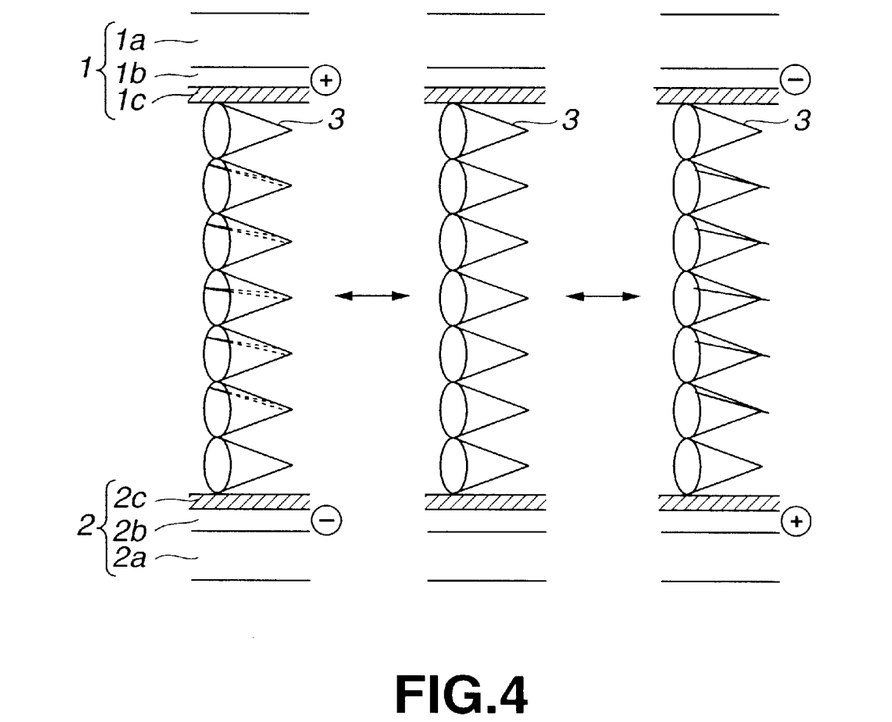
FIG. 4 is a schematic view showing the behavior if a liquid crystal molecule looking from the direction b of FIG. 1.
Figure 5:
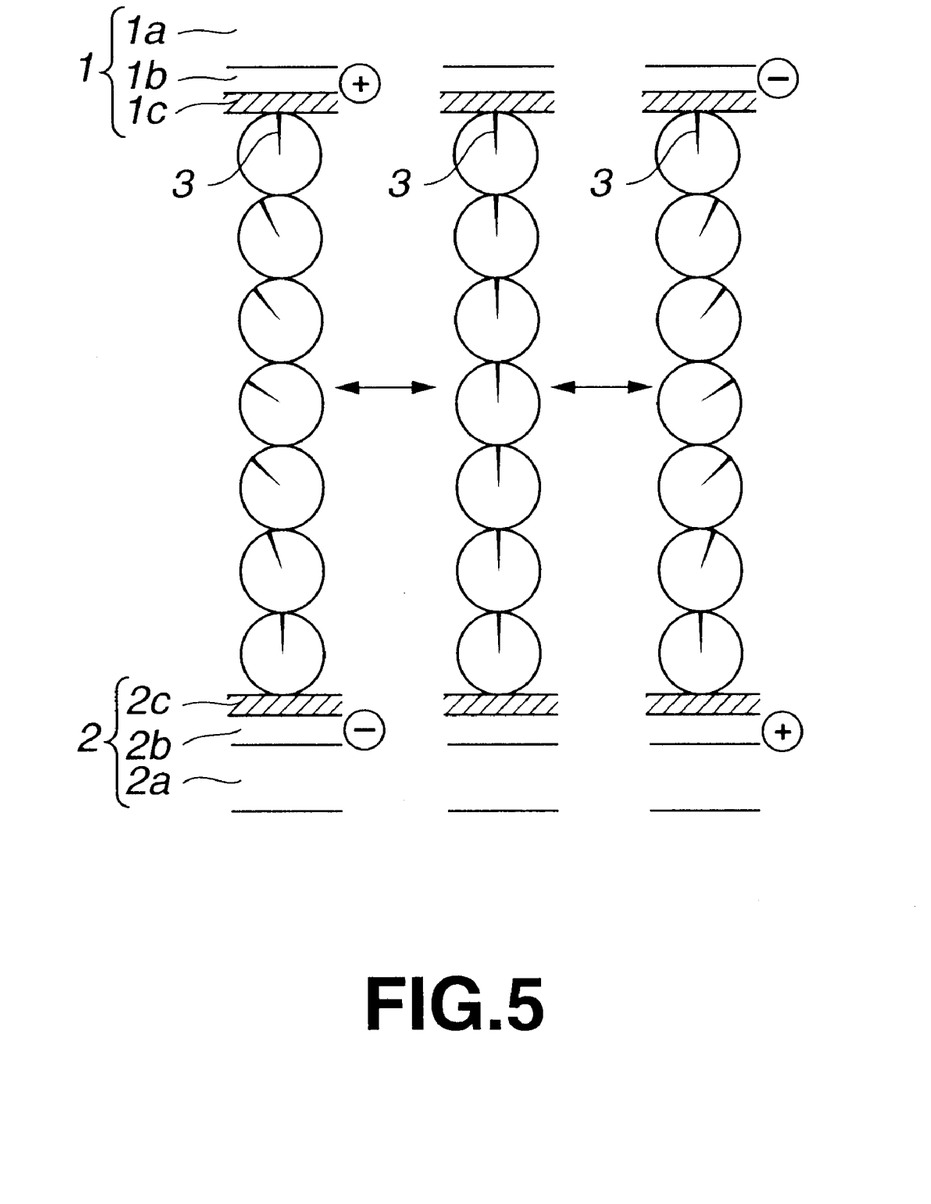
FIG. 5 is a schematic view showing the behavior if a liquid crystal molecule looking from the direction c of FIG. 1.

The behavior of the liquid crystal molecules at this time is shown in FIGS. 3 to 5. Specifically, FIG. 3 shows the behavior of the liquid crystal molecule when seen in the direction a in FIG. 1, FIG. 4 shows the behavior of the liquid crystal molecule when seen in the direction b in FIG. 1 and FIG. 5 shows the behavior of the liquid crystal molecule when seen in the direction c in FIG. 1. in these figures, the glass plates 1a, 2a, carrying thereon transparent electrodes 1b, 2b and the rubbing-processed layers 1c, 2c, are provided as the substrates 1 and 2, respectively.

If the electrical field is not applied, the direction D of the director of each liquid crystal molecule coincides with the direction of uniaxial orientation processing of the rubbing-processed layers 1c, 2c of the substrates 1 and 2. That is, the direction of the director of the liquid crystal molecule 3 is at the center of the projection suirfaceof the cone.

This state is the monostable state. If, for example, the firection of polarization P of the polarizer is coincident with the directions of the processing for orientation X, Y, and the direction A of polarization of the analyzer is perpendicular thereto, the light is not transmitted and hence the dark state is set.

If, on the other hand, the electrical field of (+) and the electrical field of (−) are applied to the transparent electrode 1b of the upper substrate 1 and to the transparent electrode 2b of the lower substrate 2, the liquid crystal molecule 3 is rotated counterclockwise, as shown on the left sides in the respective drawings. It is noted that the direction of rotation depends on the polarity of the liquid crystal material. It is noted that the larger the distance from the interface with the rubbing-processed layers 1c, 2c, the larger becomes the apparent tilt angle. This is possibly ascribable to the fact that the interaction is significant in the interface between the rubbing layers 1c and 2c, such that the so-called anchor effect is in operation.

Meanwhile, the maximum value $\theta_{MAX}$ of the tilt angle $\theta$ is determined by the strength of the electrical field, such that the maximum value $\theta_{MAX}$ of the tilt angle $\theta$ is varied continuously with the strength of the electrical field. Of course, the average value $\theta_{AVG}$ of the apparent tilt angle of the liquid crystal cell in its entirety is also changed therewith continuously.

The above holds when the electrical fields (−) and (+) are applied to the transparent electrodes 1b of the upper substrate 1 and to the transparent electrode 2b of the lower substrate 2, respectively. In this case, the liquid crystal molecule 3 is rotated clockwise, as shown on the right sides in the respective drawings, with the maximum value $\theta_{MAX}$ as well as the average value $\theta_{AVG}$ of the tilt angle $\theta$ being changed continuously. That is, the intensity I of the transmitted light in the liquid crystal cell is as shown in the following equation 1:

$$I I_0 \sin^2 2\theta \qquad (1)$$

where $I_0$ is the intensity of the light before transmitting through the cell. This gives the analog gradation.

If the external electrical field, so far applied, is removed, the initial state is rapidly restored by the internal electrical field of the liquid crystal and the stabilizing effect of the interface.

The ferroelectric liquid crystal used in the aforementioned liquid crystal display device may be any suitable liquid crystal material that is able to assume the SmC* phase. It is however desirable that, if the orientation is taken into account, the spiral pitch of the SmC* phase be sufficiently long. It is also desirable that large spontaneous polarization be exhibited and that the SmC* phase be displayed over a broad temperature range inclusive of the room temperature.

Therefore, such a composition obtained on mixing a known chiral liquid crystal, and non-chiral liquid crystals, such as fluorine-substituted derivative of a tricyclic ester, a phenyl pyrimidine or phenyl benzoate liquid crystal (host liquid crystal), is preferably employed. Of these, the phenyl pyrimidine based liquid crystal is most desirable in view of defects.

If the mixture of the chiral and non-chiral liquid crystals is used as explained above, the amount of addition of the non-chiral liquid crystal as the host liquid crystal to the chiral liquid crystal affects the contrast and the response time. For maintaining the practical response time and high contrast, the amount of addition of the chiral liquid crystal is desirably 1 to 20 wt %.

The present invention features adding to the ferroelectric liquid crystal a compound obtained on linking alkyl chains to both terminal ends of a phenyl pyrimidine skeleton, with the sum of carbon atoms of the alkyl chains being 17.

Examples of the added compounds include the compounds shown by the following chemical formula:

where m, n denote integers and, more specifically, the compounds of the above formula (3) where m=9 and n=8, m=8 and n=9 and m=7 and n=10.

This realizes a specifically stable monostable mode, while improving the black level and the contrast ratio.

The content of the above compound in the liquid crystal composition is preferably 1 to 50 wt %. If the content of the above compound is less than 1 wt %, the result achieved is not outstanding. On the other hand, the content of the above compound of 50% represents the practical limit, such that, if 50 wt % is exceeded, the temperature range within which the SmC* phase is demonstrated is narrow.

EXAMPLES

In the following, specified Examples of the present invention are explained based on experimental results.

Fabrication of a Display Panel

The method for fabricating a display panel used in the present Examples is explained.

Figure 6:
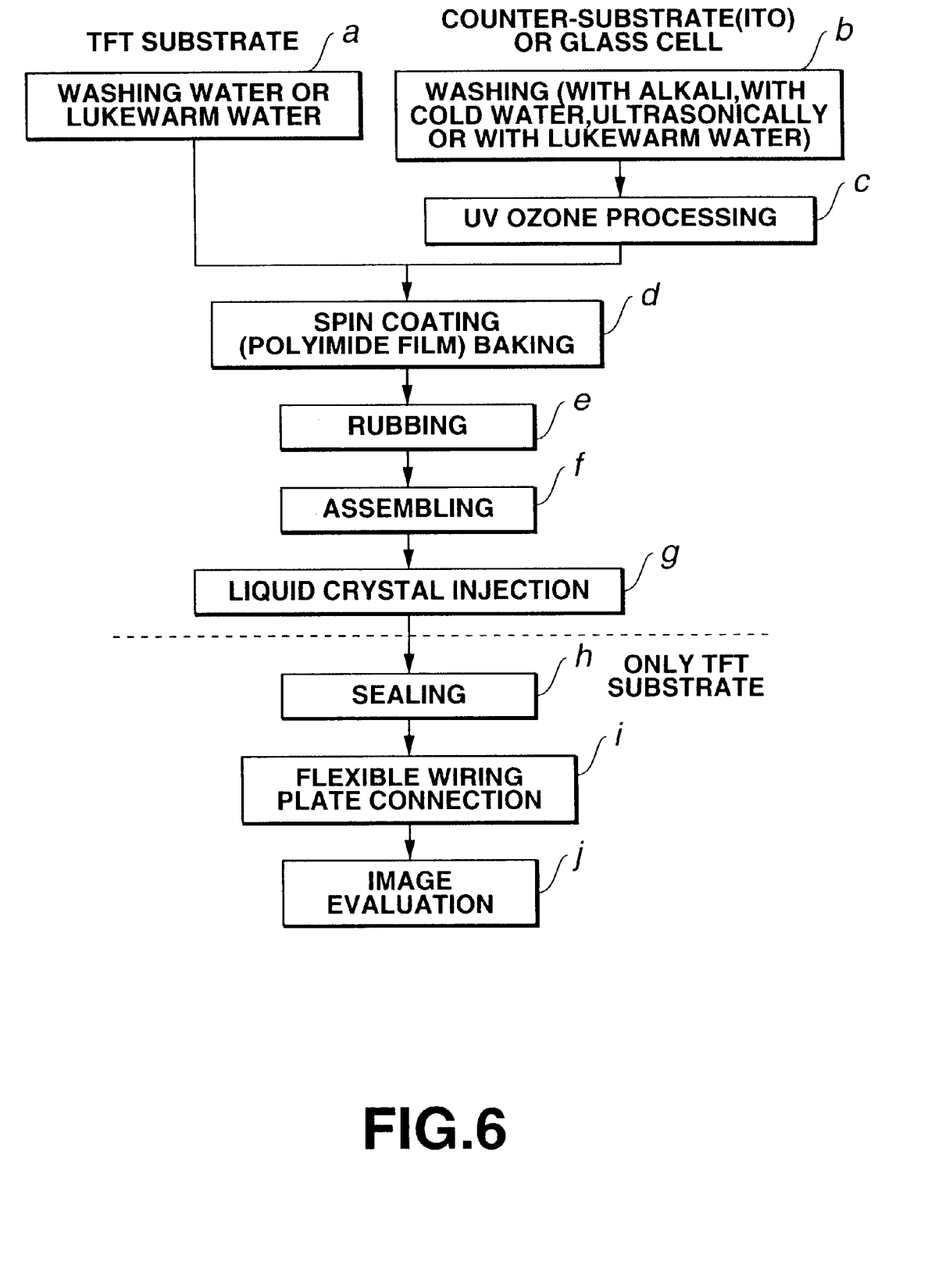
FIG. 6 is a flowchart illustrating the process for manufacturing the production process of a display panel.

In the following, a glass panel, a TFT substrate and a counter-substrate, carrying an ITO electrode on its one major surface, as shown in FIG. 6, are explained. As a TFT substrate, a TFT substrate for a trade name LCX016 manufactured by the assignee company was used.

a. Rinsing of a Panel

TFT substrate: washed with water shower four times, without using ultrasonic waves, but with washing with warm water . . . (step a)

counter-substrate: washed with alkali ultrasonically, washed with water four times ultrasonically and washed with warm water . . . (step b)

UV ozone processing . . . (step c)

glass cell: washed in the same way as for the counter-substrate.

b. Formation of a Polyimide Film (step d)

A polyimide film was applied by spin coating at 1000 rpm/ 5 sec and at 3500 rpm/ 30 sec, after which the film coated was allowed to stand a day in a nitrogen box and baked at 50° C. for 30 minutes and at 180° C. for four hours.

c. Rubbing (step e)

Rubbing was performed to permit assembling in an anti-parallel state and in a direction parallel to the rubbing direction. The rubbing conditions are 300 rpm, table speed of 2 mm/sec, and an amount of intrusion of 0.2 mm. The same conditions were used for the glass cell.

d. Assembling (step f)

A sealing composition was coated on the counter-substrate by a screen printing method or using dispenser. The TFT substrate was placed facing an electrode surface. Assembling was in anti-parallel.

e. Injection (step g)

On the upper portion of an injection port was affixed a liquid crystal desired to be injected. The liquid crystal was injected by a vacuum oven in a vacuum state at a temperature higher by 10 to 20° C. than the nematic phase —isotropic phase transition temperature. After completion of the injection, the pressure was gradually restored to the ambient pressure and temperature. For a glass substrate, injection was by a hot stage manufactured by METLAR INC. under the trade name of FP82.

The following was carried out only for the TFT substrate.

f. Sealing (step h)

The injection port was sealed with a sealant.

g. Mounting the Flexible Wiring Plate (step i)

A flexible wiring plate was pressure-fitted to an electrode of the TFT substrate, using a pressure-fittingdevice.

h. Picture Evaluation (stepj)

Picture Evaluation Was by a Dedicated Driver.

A driver for a TN liquid crystal display device was used to perform the picture evaluation in the so-called normally black mode.

Investigations Into the Liquid Crystal Composition A

The composition composed of the compounds a to g of the following chemical formulas was used as the basic composition of the liquid crystal composition A and the difference in characteristics in the display panel was checked as 2-cyclic phenyl pyrimidine (compound c) was changed to the following compounds h, i and j shown by the following chemical formulas:

TABLE 1

| | added compounds | | |
|---|---|---|---|
| | m + n ≠ 17 | m + n = 17 | |
| | compound c | compound h | compound i | compound j |
| contrast | 34 | 70 | 77 | 106 |
| memory cone | 7.2° | 0° | 0° | 0° |

Measurements were made of the contrast in driving with the monostable ferroelectric liquid crystal display device mode. It was found that, whilst the contrast in using a compound c with the sum of the number of carbon atoms of the alkyl chain not equal to 17 was 34, the contrast was improved to 70, 77 and 106, with the use of a dicyclic phenyl pyrimidine (compound h), a compound i and a compound j, each with the sum of the number of carbon atoms of the alkyl chain equal to 17, respectively.

If the dicyclic phenyl pyrimidine, with the sum of the number of carbon atoms of the alkyl chain equal to 17, is used, the memory cone is suppressed to 2° or less. If the memory cone is larger, contrast is not achieved, while the black level is worsened.

In particular, if the compound i (m=8, n=9) or the compound j (m=9, n=8) is used, the black level and the monostability (uniform orientation in case the tilt angle of the liquid crystal is changed as the electrical field is applied and the original state of orientation is recovered as the electrical field is removed) are improved appreciably to achieve high contrast.

Researches in Liquid Crystal Composition B

A composition made up of compounds p to w shown by the following chemical formulas:

was used as the basic composition of a liquid crystal composition B. The compound r (dicyclic phenyl pyrimidine) was changed to the compound j and the difference caused in the characteristics of the compositions was investigated. The results are shown in Table 2.

TABLE 2

| | added compounds | |
|---|---|---|
| | m + n ≠ 17 compound r | m + n = 17 compound j |
| contrast | 30 | 120 |

As may be seen from this Table 2, on using an additive compound j in place of the compound r contained in the liquid crystal composition B, with the same content, the black level was darker, with the contrast being increased from 30 to 102.

Addition of Two or More Compounds

Similar improvement in monostability was noticed when two or more of the compounds h, i and j were added in combination.

Specifically, mixtures of additive compounds, namely the mixtures of compounds h-i, h-j and i-j, containing the respective compounds in different proportions, were contained in place of the compounds a or r in the liquid crystal compositions A and B. It was found that monostability was exhibited, whilst the black level was improved.

Table 3 shows characteristics in case the above-mentioned mixtures of the additive compounds, with the mixing ratio of 1:1, were added in place of the

TABLE 3

| | additive compounds | | |
|---|---|---|---|
| | compounds h + i | compounds h + j | compounds i + j |
| contrast | 105 | 108 | 140 |

Also, the compounds h, i and j were mixed at a ratio of 1:1:1 and used as an additive compound. It was seen that the contrast was improved to 100.

Researches into the Amount of Addition

It was found that, if the compound j was used as the additive compound in place of the compound c, the black level could be maintained despite changes in the amount of addition.

The content of the compound j was changed to various values between 0 wt % and 26.7 wt %. It was found that, although monostability was not displayed at 0 wt %, monostability was maintained for other proportions. Measurements were also made of the contrast for these proportions. It was found that, whilst the contrast for 0 wt % was 60, that for 1 wt %, 3 wt %, 4.45 wt %, 13.35 wt % and 22.25 wt % was improved to 82.5, 123.8, 168, 158 and to 102.7, respectively.

What is claimed is:

1. A monostable ferroelectric liquid crystal display device made up of a pair of substrates, which have been subjected to uniaxial orientation processing, and which are arranged facing each other so that the respective directions of the orientation processing will be subsequently parallel to each other, and a ferroelectric liquid crystal material which has a chiral smectic C phase, and which is charged between these substrates, with a projection component on the substrates of an axial direction of a cone drawn by a liquid crystal molecule of said ferroelectric liquid crystal and with a projection component on the substrates of an axial direction of the liquid crystal molecule itself being subsequently equal to the direction of the orientation processing of the substrates, with the liquid crystal device being monostabilized with this state as an initial state, wherein the ferroelectric liquid crystal material is a liquid crystal composition containing a compound comprised of a phenyl pyrimidine skeleton on both terminals of which are linked alkyl chains the sum total of carbon atoms of which is equal to 17, said compound having a content in said liquid crystal composition of 1 to 50 wt %.

2. The monostable ferroelectric liquid crystal display device according to claim 1 wherein said compound is at least one selected from the group consisting of the compounds represented by the following chemical:

where m and n each denote integers; wherein m and n in said compound are m=8 and n=9 or m=7 and n=10.

3. The monostable ferroelectric liquid crystal display device according to claim 1 wherein said liquid crystal composition contains a chiral component having spontaneous polarization, dicyclic phenyl pyrimidine and tricyclic phenyl pyrimidine.

* * * * *